United States Patent Office.

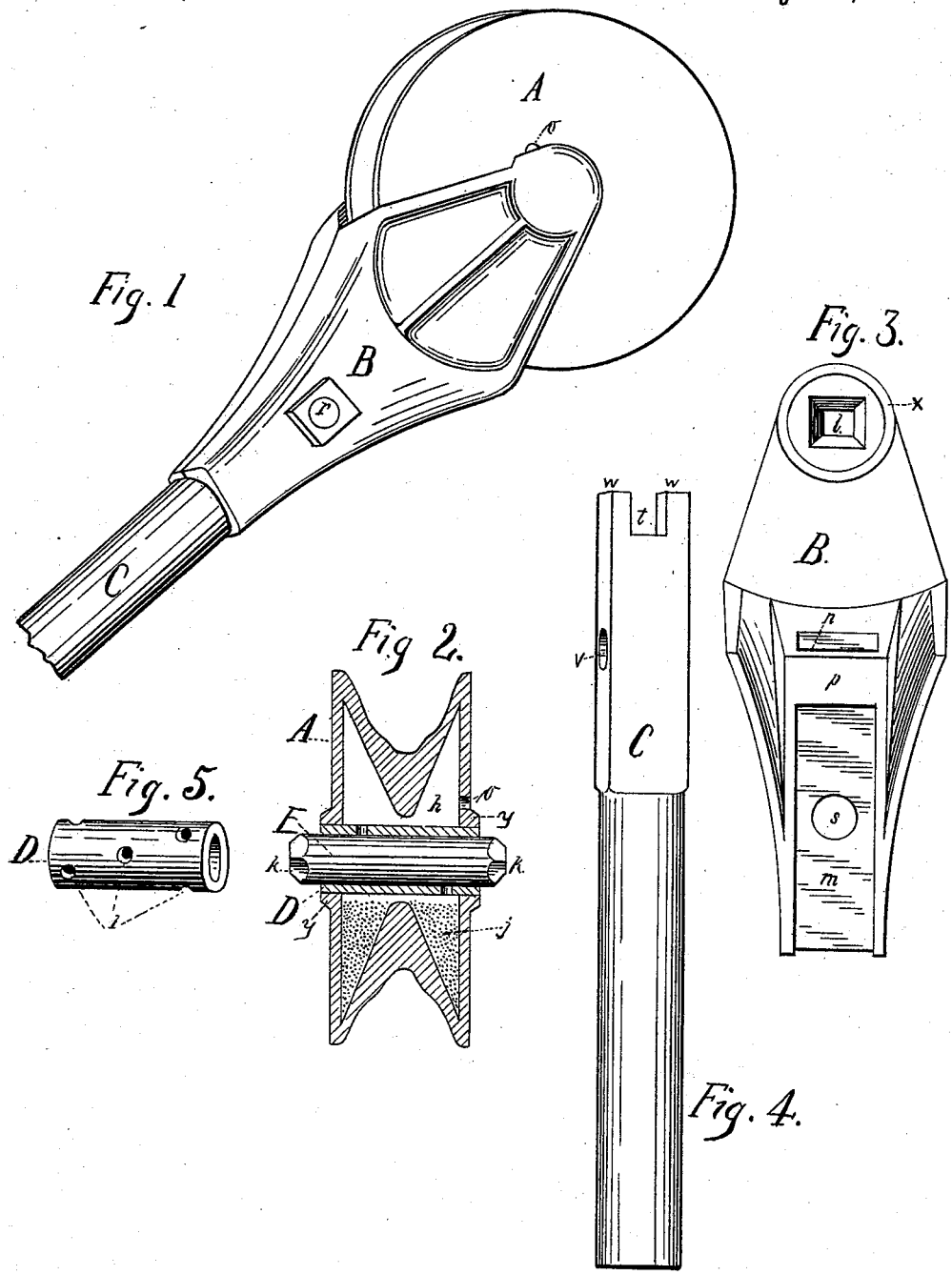

WILLIAM H. DALBEY, OF INDIANAPOLIS, INDIANA.

COMBINED TROLLEY HEAD AND WHEEL.

SPECIFICATION forming part of Letters Patent No. 539,798, dated May 28, 1895.

Application filed October 11, 1894. Serial No. 525,580. (No model.)

*To all whom it may concern:*

Be it known that I, WILLIAM H. DALBEY, a citizen of the United States, residing at Indianapolis, in the county of Marion and State of Indiana, have invented a new and useful Improvement in a Combined Trolley Head and Wheel, of which the following is a specification.

My invention relates to new and useful improvements in combined trolley-heads and wheels of the class used on electric railways employing an overhead wire for the transmission of the electric current.

The objects of my invention are to provide a combined trolley-head and wheel that will be strong and durable, that can be easily repaired in case of breakage, and means for continuously supplying lubricant to the journal of the wheel. I attain these objects by means of the constructions shown in the accompanying drawings and described in the following specification.

In the drawings which are made a part hereof, similar letters of reference designate similar parts throughout the several views.

Figure 1 is a perspective view of my combined trolley head and wheel. Fig. 2 is a vertical sectional view of the wheel and bushing with the journal in the bushing. Fig. 3 is a view of the inside of one of the sections of the head, slightly in perspective. Fig. 4 is a perspective view of the end of the trolley-arm forming a part of the head. Fig. 5 is a perspective view of the journal-bushing.

Referring to the details of the drawings, A, designates the trolley wheel; B, the casings forming the head; C, the end of the trolley arm; D, the journal bushing, and E the journal.

The wheel A, is hollow and is provided with the opening $o$, through which a suitable lubricant may be inserted into the chamber $h$. The bushing D, fitted within the wheel is provided with suitable openings $i$, through which the lubricant $j$, will gradually diffuse itself upon the journal E. The ends of the journal E, extend slightly beyond the bushing D, said ends being slightly tapered and squared as at $k$, to fit into like shaped apertures $l$, in the two casings B. The inside of the casings or sections B, forming the head, are constructed with angular grooves $m$, said grooves being of a depth equal to one-half their width. At the upper end of the said angular grooves $m$, are rectangular openings $n$, said openings being as long as the width of the angular grooves $m$, and the lower edge of the openings coinciding with the bottoms of the grooves $m$, thus forming a substantial continuation of the grooves $m$, at their bottoms, but leaving a portion $p$, at the upper ends of the grooves $m$, thus forming a connection between the upper edges of said grooves. The sections B, are also provided with openings $s$, through which the bolt $r$, is adapted to pass. The end of the trolley arm C, is squared at its upper end for a sufficient distance to fit within the angular grooves $m$, and has the slot $t$, cut across the upper end, of a sufficient depth and width to allow the two portions $p$, of the sections B, to fit snugly within the slot $t$. The arm C, is also provided with the opening $v$, and through which the bolt $r$, is adapted to pass.

It will be seen that the sections B, can be quickly laid together with the wheel A, in place between, and the end of the trolley arm C, inserted in the square opening, formed by the angular grooves $m$, and pressed upward until the rectangular ends $w$, of the arm C, enter the rectangular openings $n$, of the sections B, thus binding said sections firmly together. Surrounding the apertures $l$, on the inner faces of the sections B, are circular boxes $x$, which are adapted to fit over and against the hubs $y$, on the wheel A, thus making a continuous connection between the head and the wheel for the passage of the electric current. The bolt $r$, is then inserted through the openings $s$, and $v$, of the sections B, and arm C, and thus prevent the withdrawal of said arm, and, at the same time, gives additional strength to the various parts by binding them together more firmly. The journal E, is held against turning by means of the squared ends $k$, which fit in the squared apertures $l$, in the sections B. A sufficient quantity of lubricant may be inserted into the chamber $h$, through the opening $o$, to thoroughly lubricate the bearing for a long period of time, as the openings $i$, in the bushing D, may be made of a size and shape to admit only the amount of lubricant necessary to properly lubricate the journal E. I preferably use as a lubricant graphite dust, but do not confine myself exclusively to such lubricant.

It is obvious that a combined trolley-head and wheel constructed as above described, will require very little attention for any purpose while in use, and in case of breakage, any part can be quickly replaced by the trainmen without being taken to the shop, thus preventing annoying delays to passengers, and loss to the owners.

Having described my invention, what I claim, and desire to secure by Letters Patent of the United States, is—

1. In a combined trolley-head and wheel, the combination of the wheel A, having the lubricating chamber h, and the hubs y, the bushing D, having suitable openings i, and the journal E, having the squared ends k, with the head sections B, having the squared apertures l, the circular boxes x, the angular grooves m, the rectangular openings n, the connecting portions d, the circular openings s, and the arm end C, having the slot t, the rectangular ends w, and the opening v, all substantially as set forth.

2. In a combined trolley-head and wheel, the combination with the head sections B, having angular grooves m, and rectangular openings n, of the arm end C, having the rectangular projections w, on the end thereof, for the purpose shown and described.

3. In a combined trolley-head and wheel, the combination of the journal E, having tapering ends k, with the head sections B, having tapering apertures l, adapted to receive the ends of the journal E, substantially as shown and set forth.

In testimony whereof I have hereunto set my hand in the presence of two witnesses.

WILLIAM H. DALBEY.

Witnesses:
H. C. BAUER,
M. H. TUTTLE.